March 12, 1968 W. C. HARMON 3,372,578
APPARATUS FOR MEASURING THE SURFACE FINISH OF ROLLED METAL
Filed Dec. 2, 1963 5 Sheets-Sheet 1
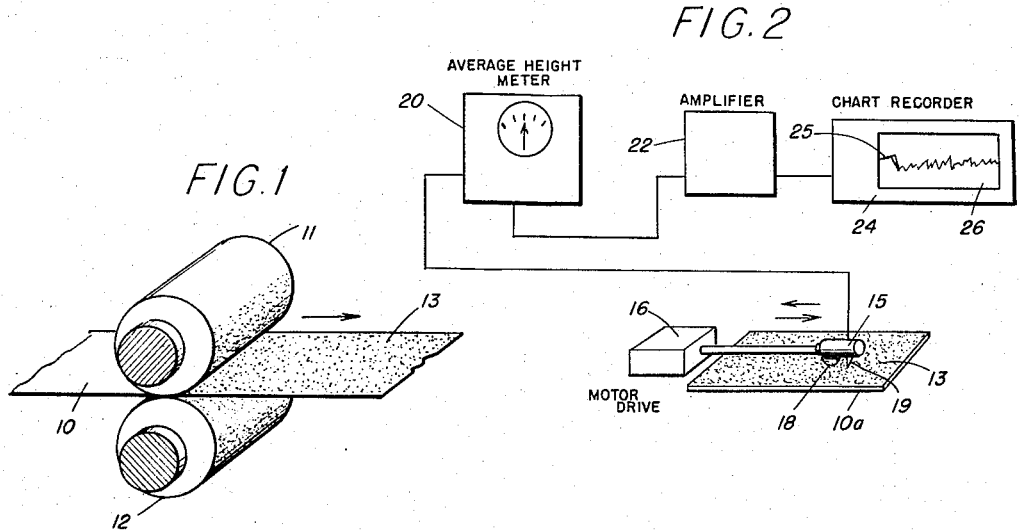
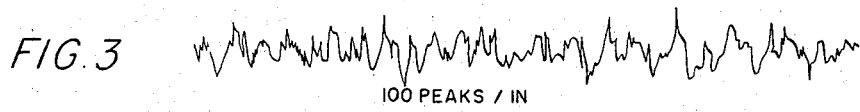
FIG. 3 — 100 PEAKS / IN
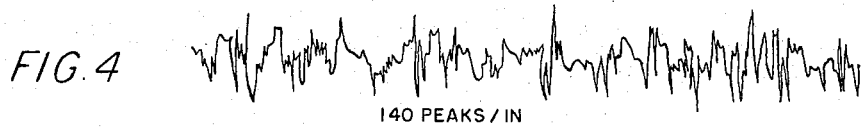
FIG. 4 — 140 PEAKS / IN
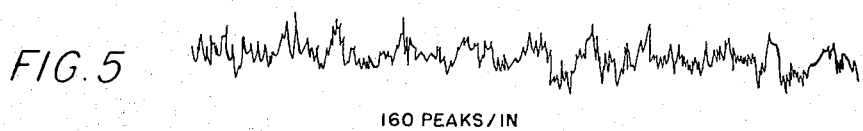
FIG. 5 — 160 PEAKS / IN
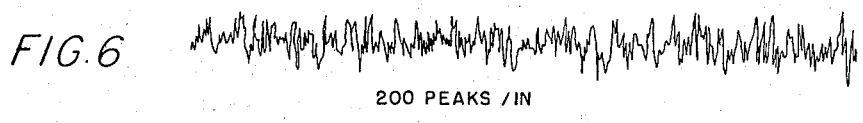
FIG. 6 — 200 PEAKS / IN
INVENTOR.
William C. Harmon
BY
W. H. Woodlief
Attorney March 12, 1968     W. C. HARMON     3,372,578
APPARATUS FOR MEASURING THE SURFACE FINISH OF ROLLED METAL
Filed Dec. 2, 1963     5 Sheets-Sheet 2
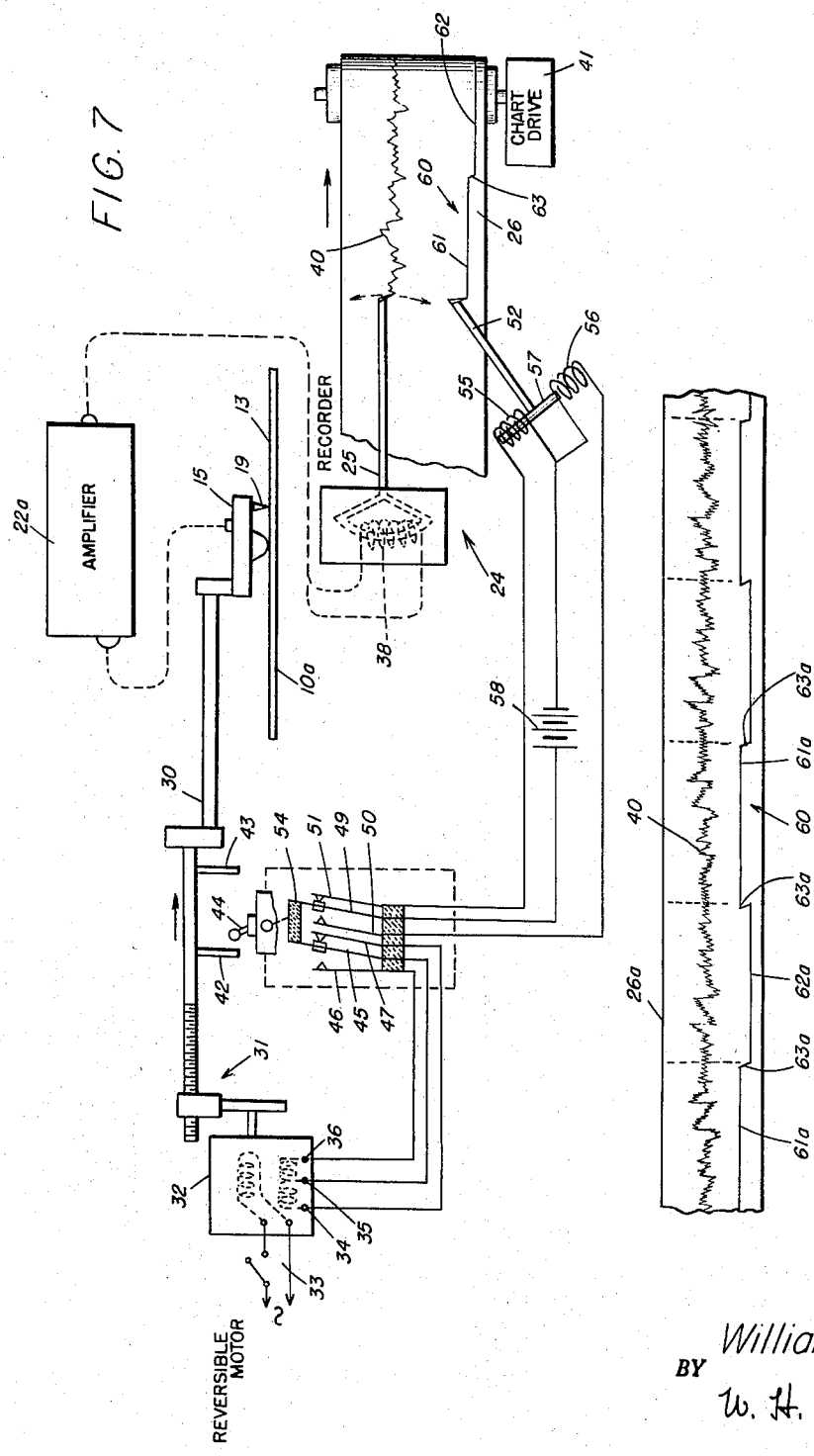
INVENTOR.
William C. Harmon
BY
W. H. Woodlief
Attorney March 12, 1968     W. C. HARMON     3,372,578
APPARATUS FOR MEASURING THE SURFACE FINISH OF ROLLED METAL
Filed Dec. 2, 1963     5 Sheets-Sheet 3
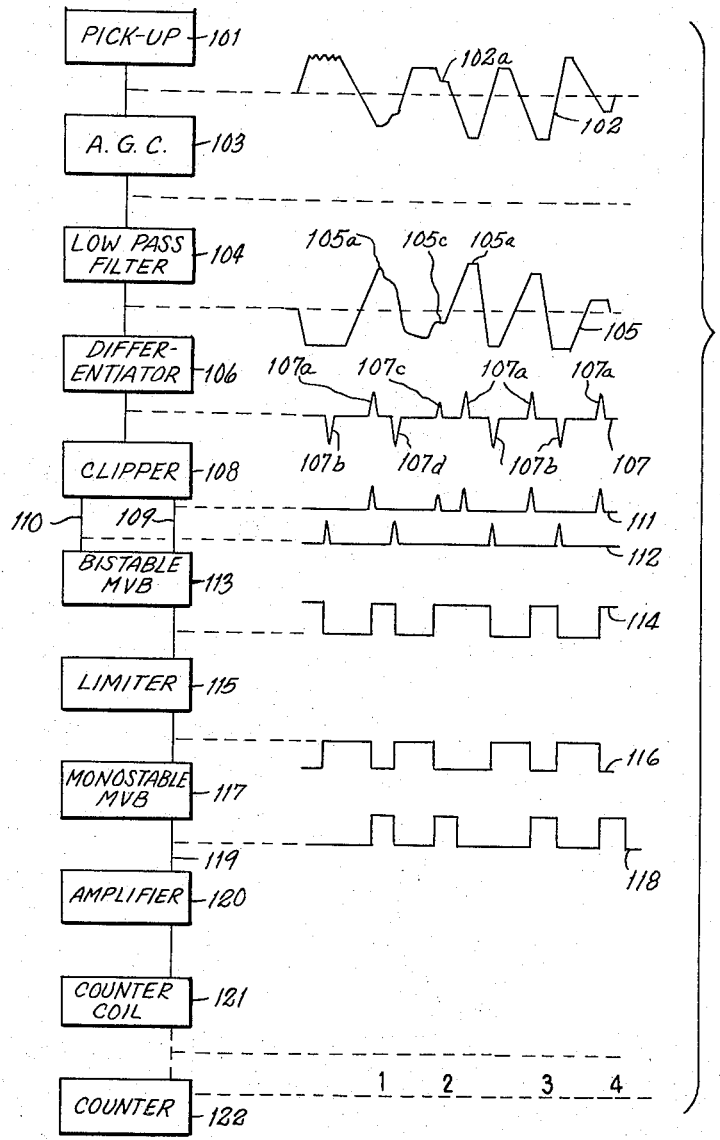
Fig.9.
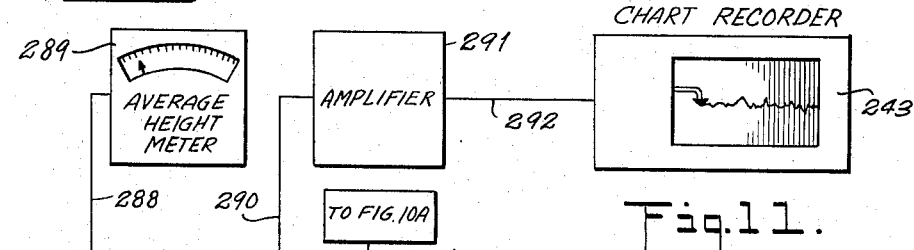
Fig.11.
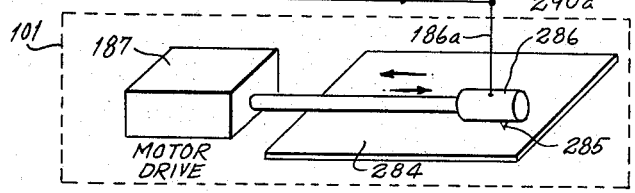
INVENTOR.
WILLIAM C. HARMON
BY W. H. Woodlief
ATTORNEY

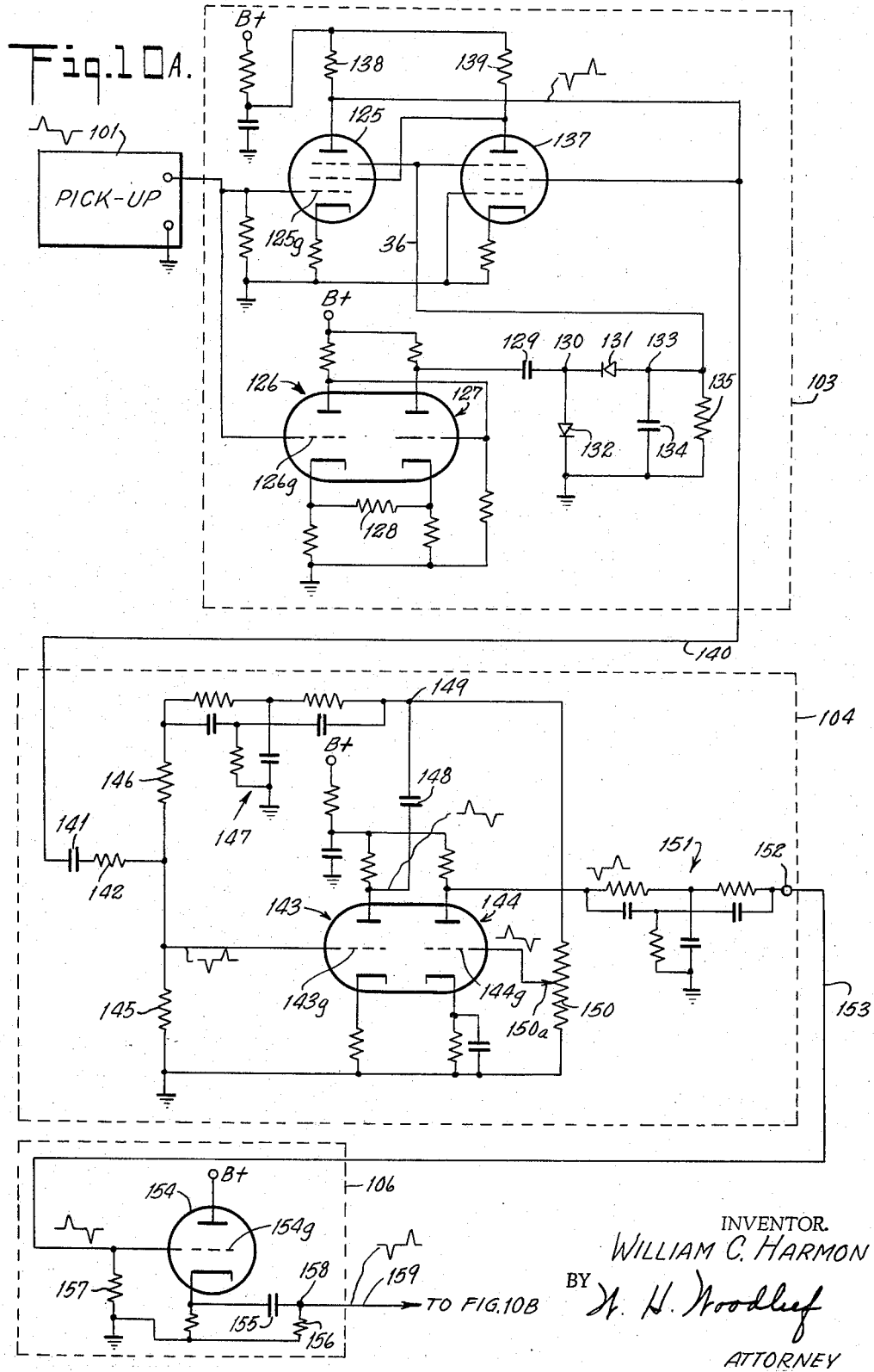

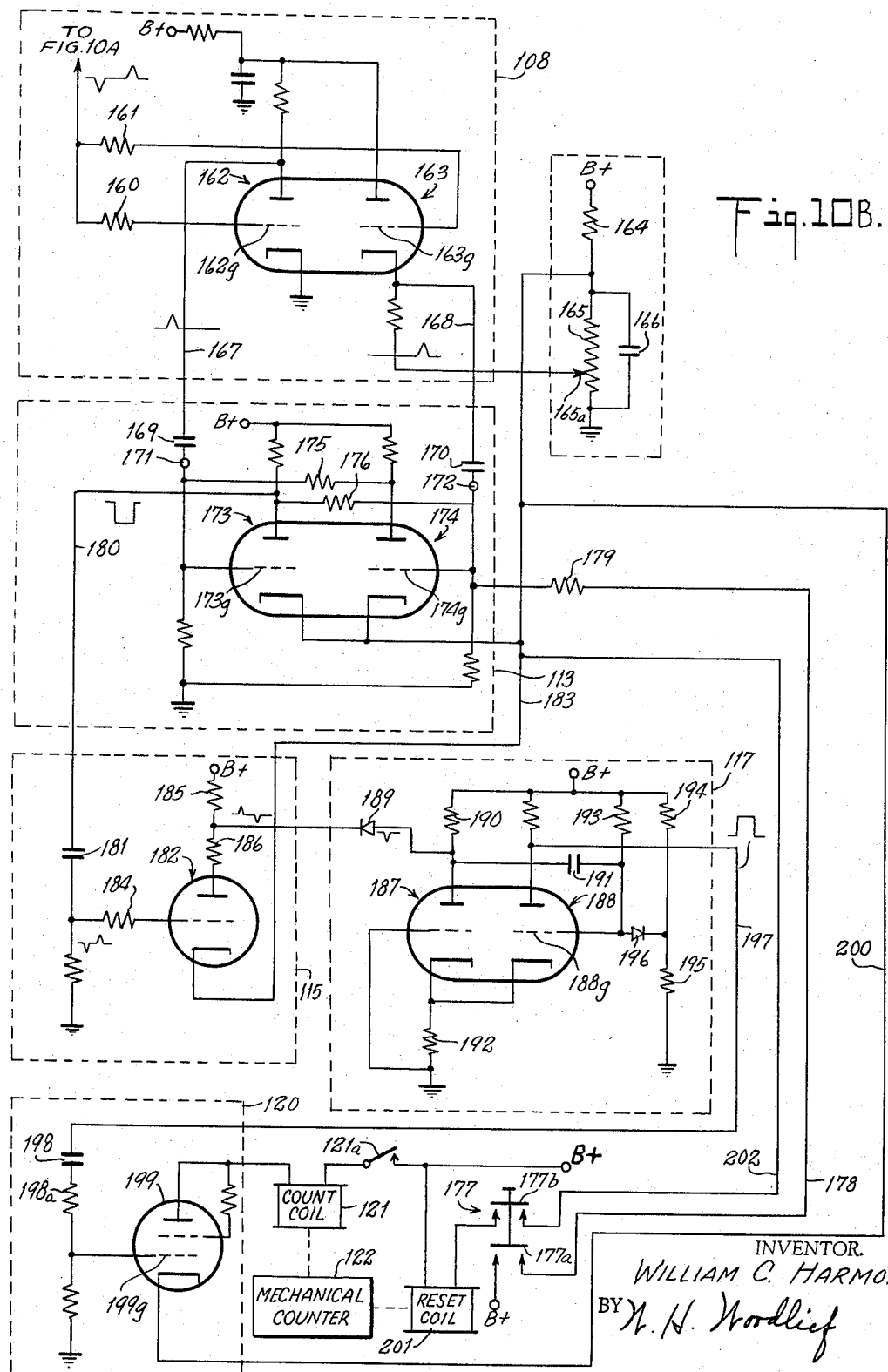

United States Patent Office

3,372,578
Patented Mar. 12, 1968

3,372,578
APPARATUS FOR MEASURING THE SURFACE FINISH OF ROLLED METAL
William C. Harmon, Chagrin Falls, Ohio, assignor to Republic Steel Corporation, Cleveland, Ohio, a corporation of New Jersey
Continuation-in-part of application Ser. No. 25,329, Apr. 28, 1960. This application Dec. 2, 1963, Ser. No. 328,779
3 Claims. (Cl. 73—105)

This application is a continuation-in-part of my copending application Ser. No. 25,329, filed Apr. 28, 1960, now abandoned, entitled Procedure and Apparatus for control of Surface Finish of Rolled Metal, and also is a continuation-in-part of application Ser. No. 27,363, filed May 6, 1960, entitled Apparatus for Measuring Surface Roughness, now United States Patent No. 3,112,642, issued Dec. 3, 1963 in which application I am a joint inventor with Tyler W. Judd.

The present invention relates to methods of measuring surface roughness, and to methods and apparatus for controlling the surface character of sheet metal, which utilize the aforesaid methods of measuring surface roughness.

This invention particularly relates to methods for measuring surface roughness which include counting the number of roughness peaks per unit linear distance.

The invention is further related to control of the production of rolled steel having a sheet surface of predetermined roughness or dullness, maintained, throughout successive or continuing production runs, to meet the requirements for use of such material.

For many purposes it is necessary that sheet steel, especially cold rolled strip, have a minutely roughened or matte finish. Such surface is desirable for painting, enameling or other coating operations applied in ultimate fabrication of articles. It is often required in steel sheet which is to be shaped by drawing, especially deep drawing as for fenders, hoods and other automobile body parts; the minutely roughened surface apparently promotes or facilitates the desired results in such work. Like surface finish is also of advantage in certain plating operations, presumably serving, as in the case of painting, to enhance the retention of the applied film or coating.

Conventionally, these roughened or matte surfaces are described as a blasted finish, from some resemblance to the effect of a sand-blasting treatment. In actual practice, the surface is achieved in the rolling operation, especially in the final or finish rolling stage whereby the steel strip is precisely reduced to the desired gauge. For this purpose, the working rolls are so prepared or figured as to impress the minute roughness on the surface, usually both surfaces, of the steel sheet in the course of rolling. While it is conceivable that other means can be employed to roughen the cylindrical roll face, such as milling, grinding, or even etching, a common and preferred final treatment is to subject the roll surface to an abrasive or minute impact blast, i.e., of the nature of sand-blasting, but preferably using hard steel particles, such as hardened tetrahedral steel pellets. Specifically, each of the opposing strip rolls is successively rough and fine ground and then subjected to the described blast treatment, followed by final hardening, if desired, of the roll surfaces. In consequence, as the steel sheet is rolled to final gauge and finish with the work rolls so treated, the desired, minute roughness is impressed in each surface, corresponding inversely and substantially exactly with the surface configuration of the rolls.

An accepted practice for determining the character and quality of these dull or roughened sheet surface finishes has been to measure the average height of the peaks which collectively constitute the roughness. For example, the configuration along any linear direction on the surface of a so-called blasted finish sheet, as described above, consists of a series of peaks and valleys, varying in size but generally coming within a determinable range of sizes. Thus, despite its minutely irregular nature, the surface is deemed capable of significant description in terms of average peak height along a given line, such measurements being often made along lines respectively running, for instance, longitudinally and transversely of the rolled strip.

Instruments are available for measuring average roughness height, as by integration or by continuous averaging. Thus, a well known instrument of the continuously-averaging type comprises an exploring device or probe, having a sensitive stylus, which is moved across the sheet surface at a standard speed, and which yields a varying voltage or other sequence of electrical signals, that is appropriately measured or analyzed in an electronic unit to yield a meter reading calibrated in average roughness height, the reading being substantially continuous while the probe device is moving.

The usual practice with these or other instruments is to measure the average height as the average deviation of the actual metal surface (i.e., its profile) from a mean or centerline above which the peaks generally rise and below which the valleys generally descend, such centerline being more specifically a line running medially along the profile such that the sums of the areas contained between it and those parts of the profile which lie on either side of it are equal. A common height reading of this sort is the arithmetical average deviation, in microinches (millionths of an inch), of all parts of the surface (along the sensed line) from the centerline, the averaged deviations being taken without regard to sign. Thus an arithmetical average height of surface roughness, so defined and measured, will be a value of the order of one fourth of the vertical distances (if considered to be averaged) between peak tops and valley bottoms. With some instruments, the average deviation is determined as the root-mean-square (RMS) average of deviations from the centerline, having the same mathematical significance as in RMS measurements of alternating current, and providing readings, for surface roughness height, which are approximately 11% higher than the values of arithmetical average for the same surfaces.

For convenience but not for limitation of the claims, reference herein will be made essentially only to readings or values of arithmetical average height of surface roughness, meaning the arithmetical average deviation as defined above. It will be understood, of course, that other types of surface height (or peak height) readings, such as RMS values, are equivalent in function, and that statements of quantities, ranges or operations (as in the claims) relative to the arithmetical average type are intended to include other types as equivalents, as by conversion of values with an appropriate factor.

For many purposes, the various degrees of roughness of steel sheet surface that are useful lie in the range of about 15 to about 100 microinches arithmetical average height; more specifically within this range, matte finishes are often supplied in three grades, viz., light matte having average roughness height of about 20 to 40 microinches, regular matte of about 30 to 60 microinches and rough matte upwards of 50, and usually up to about 80, microinches.

While standards of this type, representative of average peak altitude, are basic requirements that must be met, it has now been found that they do not always assure suitability. Different lots of steel strip of a given gauge, having the same theoretically satisfactory measurement of roughness height, are sometimes found to behave differently when drawn, or when required to be painted or coated, to the extent that while some of the material is satisfactory, other lots of the sheet have been rejected as unacceptable. Heretofore deemed the only important criterion of suitable matte finish, determinations of average peak amplitude have thus not explained why theoretically suitable steel sheet has failed in drawing operations or did not paint or plate properly. Inadequacy of the surface, moreover, cannot be seen or even empirically judged by visual inspection, especially since other factors such as differences of composition, prior treatment and the like also greatly vary the appearance of the matte finish as it is seen.

Chief objects of the present invention (among others apparent below) are therefore to improve the production of rolled steel, especially with respect to new methods and standards for measuring surface roughness and for controlling the surface characteristics of the rolled steel, and improved instrumentation for examination thereof, whereby blasted or matte finishes can be produced in a uniformly satisfactory manner, as for the above or similar uses.

To these and other ends, the present invention is predicated on certain significant discoveries relative to the nature and cause of deficiencies in these matte or blasted finishes on rolled steep strip. In the first place, it has been found that the effectiveness of the roughened surface is related not only to the amplitude of the irregularities but in an unexpectedly critical manner to the frequency or number of peaks per unit length in significant directions along the surface. Extensive investigation was conducted with sheets that were both satisfactory and unsatisfactory for users, by making enlarged graphical representations of the actual surface profile. These were made with sensitive exploring devices of the type used in measuring peak amplitude, connected to operate a recording instrument of the nature of an oscillograph, whereby a chart record is obtained of the undulations sensed by the device along a predetermined path of travel. It was then found that in unacceptable surfaces the actual peaks in the profile charts were more widely spaced, at least to a considerable extent throughout the length of the profile, than in acceptable surfaces, where such peaks (and valleys) were much more closely and uniformly spaced so as to provide what might be called a "dense grain" configuration.

These examinations of surface profiles, presented in an enlarged manner and with some exaggeration in a direction vertical to the surface, thus revealed that the suitability of a matte surface, as for purposes of the sort mentioned above, is determined both by the average roughness height (in microinches) and by the number of peaks per inch along a predetermined line of the surface, and more particularly, in most cases, by such number of peaks along lines both longitudinal to and transverse of the direction of strip rolling. These factors of average height and frequency appear about equally important as a measure of the adequacy of the matte finish. More specifically, it has now been found that such finishes, whether light, regular or rough in degree as determined by average height, are suitable if they have more than about 140 peaks per inch, but are unsuitable if the number of peaks per inch is appreciably less than this value. These findings are predicated on many tests and examinations, involving actual counting of peaks in the recorded surface profiles, as related to findings of users with respect to acceptability of the sheet steel for the purposes mentioned above.

It has also now been discovered that usually the strip rolls formed to impress the so-called blasted finish are effective over a certain time, i.e., for rolling a certain quantity of strip, but after some use, fail to yield the desired density or frequency of peaks or undulations, even though, in most cases, the average peak amplitude remains satisfactory. It appears that continued use of the rolls causes breakage of many of the sharp corners and indentations, particularly at the apex of the peak, so that a large number of minor regions of the profile (of sheet produced by such rolls) become smoothed out, especially in that individual peaks become lost. In consequence the number of peaks, as counted, is reduced in any given length, and in falling below the critical minimum, this reduction of peak frequency impairs the utility of the strip product. As indicated above, the deficiency of the rolled sheet surface in these respects was not usually revealed by measurements of average height (which may remain at a satisfactory value), but were determined by recording the contour of the surface and counting the number of peaks which represent the surface irregularities, over a given length.

In an important aspect, the procedure of the invention thus relates to a continuing production method for rolling matte-finish steel strip to have a predetermined roughness primarily characterized by a selected arithmetical average height (or an average height in a selected range) and embraces the steps of preparing the finishing work rolls so as to have a surface configuration inversely corresponding to the desired roughness and specifically for impressing on the strip a finish having substantially more than 140 peaks per inch. The method further involves rolling successive steel strips with such work roll, subjecting at least periodically selected ones of such product strips to an examination of surface characteristics, including determination of the number of peaks per linear inch in at least one given direction, and controlling the succession of rolling operations in accordance with such determinations, so as to keep the product at a roughness which is characterized by at least 140 peaks per linear inch, such control being effected by replacing the work roll (in its use to produce the desired strip), from time to time as necessary, with succeeding work rolls, in the same or another stand, that are at least more newly prepared to have the desired matrix configuration. In this way, pursuant to the present discoveries respecting the significance of the frequency of peaks or equivalent irregularities in the surface, and the critical limits below which such peaks should not depart, the rolling operations are effectively performed and controlled so as to maintain uniformly acceptable surface characteristics of the steel strip.

The periodic determinations of surface character preferably include measurements of average height as well as number of peaks per linear inch or the like, it being further understood that replacement of the work rolls, in practice, is occasioned whenever there is a departure below the minimum requirements of either height or frequency of peaks. Conveniently the determinations, indeed for both measurements, are made by traversing the product surface with a peak sensing device. Signals from such device are translated into average height measurements, and are also translated into determinations of the number of peaks per linear inch, an effective way of performing the latter operation being to record the profile contour as detected by the exploring or sensing device, and counting the peaks in such contour (or equivalently, the valleys) over a horizontal distance corresponding to a predetermined unit length along the sheet surface. Alternatively, the peaks may be counted by electrical counting apparatus. In general, it is found that the number of peaks per inch, as detected over a series of successive strips rolled in the mill, usually reaches the critical minimum before the average height of irregularities has departed below a desired value. However, for best results, it is necessary to take both types of reading, and to regulate the course of production, as by installing freshly prepared rolls, in accordance with any approach of the tested product to a departure from either of the described standards.

With these procedures, it has been found that steel strip can be kept to a uniformly satisfactory condition of surface finish over a long continued series of rolling operations, thus avoiding rejection of the product as undesirable in surface. While a minimum of 140 peaks per inch, preferably determined both longitudinally and transversely of the rolled strip, constitutes a suitable measure of utility for the product, best results are often obtained by following a somewhat higher standard, for example in replacing the work rolls essentially as soon as the product begins to fall below 160 peaks per inch. The procedure, as will now be apparent, is capable of maintaining any desired minimum; for example, it is found that superior results, for many uses, are attainable if the peak frequency is kept at 200 peaks per inch or above, so that detected departure of a lower frequency can be utilized as a criterion for roll replacement, to keep the product at this uniformly high level of density of surface irregularity.

Further features of the invention, including improvements in the recording or measuring of surface characteristics, will be apparent from the following more detailed description. For better illustration of the invention, reference is also made to the accompanying drawings, wherein:

FIG. 1 is a highly simplified view of a pair of working rolls, yielding the matte finish;

FIG. 2 is a diagrammatic view of the testing instrumentalities, whereby the character of the surface is determined;

FIGS. 3, 4, 5 and 6 illustrate recorded profiles of matte-surface sheet steel, having respectively different numbers of peaks per inch;

FIG. 7 is a highly simplified, diagrammatic view of the peak density recording apparatus including novel features with respect to correlation or reading of the chart contour record;

FIG. 8 is a specimen of a contour record or profile, with supplemental marking, as produced in the equipment of FIG. 7, for designating the direction of surface exploration;

FIG. 9 is a block diagram of an apparatus for counting roughness peaks;

FIGS. 10A and 10B, taken together, comprise a wiring diagram of the apparatus shown in the block diagram of FIG. 9; and FIG. 11 is a diagrammatic view, similar to FIG. 2, showing the connection of the apparatus of FIGS. 9 and 10 to the testing instrumentalities of FIG. 2.

The basic procedure to which the present improvements are applied is in the rolling of steel strip, particularly in the final pass where the sheet 10 (FIG. 1) traverses the coacting work rolls 11, 12 which are configured to impress the so-called blasted finish 13 on the sheet. As explained above, the surfaces of the rolls 11, 12 are prepared, after the usual rough and fine grinding, by blast-like impact of hardened angular steel pellets or the like. The nature of this sand-blast type of treatment, including the dimensions of the pellets, is selected to provide at least initially the desired frequency or spacing of the roughness peaks in the rolled strip. Having in mind a minimum of 140 peaks per inch, the initial character of the rolls 11, 12 should be such as to exceed this minimum, i.e., should almost certainly provide at least 160 peaks per inch, and indeed preferably 200 peaks per inch or higher.

Although the surfacing action of the rolls 11 is applicable to other strip rolling operations or the like, it is of special significance in cold rolling of steel to conventional gauges, of which notable examples are those used for body parts in the automobile industry. For convenience, the sheet 10 is sometimes herein identified by its conventional designation as strip, it being therefore understood that such term is used generically (unless other indication appears) to embrace steel in the form of sheet as produced by a rolling operation.

In accordance with the present invention, the product of the finish rolling operation is periodically subjected to examination for its surface characteristics; preferably one or more specimens of each coil of strip so rolled are tested in this fashion. Thus, FIG. 2 illustrates a sample 10a of the strip, being examined as to its matte or blasted finish 13. While other means may be employed, including the means described in the above-mentioned Harmon and Judd Patent No. 3,112,642 and also described below in connection with FIGS. 9 to 11, for automatically counting the surface peaks, or measuring their frequency in a given length of surface path, FIG. 2 shows a usable form of test equipment, in which a sensitive device 15 is mechanically connected to be moved across the surface 13 by a motor drive unit 16, at a controlled constant speed. The sensing head 15, resting partly on a skid 18, carries a fine diamond pointed stylus 19 that follows the minutely rough contour of the steel surface, along the line of motor driven traversal. The head 15 comprises an electronic transducer, of known character, which furnishes electrical signals, e.g., of varying voltage, representing the surface undulations, to the meter unit 20, also a known device, which electronically translates the signals into a constantly-averaged reading of height. Specifically, for example, the meter may be such as to provide a continuous reading of the arithmetical average deviation of the surface contour, as explained above.

The varying electrical signal from the stylus-controlled transducer in the device 15, is also fed, as from an appropriate locality in the introductory circuits of the meter 20, through an amplifier 22 to a recording device 24, where the variations of current from the amplifier are converted to transverse movements of a pen arm 25 that makes a continuous mark on the traveling chart 26, the latter being driven at a suitably constant speed so that a given distance on the chart will be directly proportional to a given distance of travel of the stylus 19. Thus the device 24, which is of the nature of a recording oscillograph, traces a profile of the surface 13 on the chart 26, such profile being preferably enlarged in both horizontal and vertical directions and indeed more greatly amplified in the vertical direction. As will be appreciated, the motor drive 16 may be of an automatically reversing sort, so that the stylus head travels first one way and then the other, the chart record on the paper sheet 26 being correspondingly indicative of tracings in both directions.

FIGS. 3, 4, 5 and 6 represent sections of profile records, such as made by the recorder 24, for various steel strip surfaces, these particular contour tracing representing one-half inch of travel of the stylus 19, at a speed of one-eighth inch per second, conventional in making height meter readings. The number of peaks in the chart reading, over a given distance, is then simply counted, to complete the determination of peak frequency or spacing. It will be appreciated that for greatest accuracy, the count can be made for traversals of the stylus in both forward and reverse directions of travel, and indeed for a plurality of such passes, final determination being taken as the average of actual counts. Likewise, for most purposes, the requirement is that the minimum number of peaks per inch be achieved in essentially all directions, i.e., as determinable by sensing the sheet surface (with the stylus) first along a line parallel to the direction of rolling and then along a line across the sheet, i.e., perpendicular to such direction.

As indicated, FIG. 3 is a profile chart of a surface showing only 100 peaks per inch, whereas FIGS. 4, 5 and 6 are profiles giving a count respectively of 140, 160 and 200 peaks per inch, approximately. FIG. 4 (140 peaks) represents the minimum useful surface character according to present understanding. FIG. 5 shows a good acceptable standard of 160 peaks per inch, the surface represented in FIG. 6 being of superior quality in roughness, viz., 200 peaks per inch. It will be appreciated that the surfaces actually examined were of comparable average height; specifically, in the case of FIGS. 3, 4, 5 and 6, the arithmetical average deviations were respectively 50, 55, 55 and 65 microinches.

In preferred practice of the invention, it may be assumed that the rolls 11, 12 were initially prepared to yield a sheet surface 13 having a count of 200 peaks per inch or more, as determined from a specimen of the initial strip rolled. Periodic examinations of the rolled product are made as production continues, and if the peak count drops below 140 peaks per inch, the mill is stopped and the rolls 11, 12 are replaced with freshly prepared ones, having a surface identical with that originally used, the first set of rolls being resurfaced for use again, or used for other purposes or discarded, as conditions may warrant. In preferred practice, replacement of the rolls should be made as soon as the peak-per-inch count drops to about 140; or if a matte-finish of superior density or fineness is desired, replacement can be made when the count drops to 160. Production of the desired matte-finish strip may thereafter be continued, with correspondingly continuing readings of surface character from time to time and with further replacements of rolls as necessary, in effect under control of the surface determinations.

Of course, readings should always be made, at the same time, of the average roughness height (as on the meter 20) to be sure that this value is maintained at the desired standard, for example to suit the selected degree of roughness. Indeed, if it happens that the average height departs from the selected range while the peak spacing remains adequate (i.e., at a sufficiently high number of peaks per inch), replacement of the roll surfaces should be made; ordinarily, the deterioration of the peak count will occur before the average height falls or otherwise departs from a suitable value.

It will be noted that the profile illustrated in FIG. 3 represents what is now found to be a poor surface for purposes of drawing, plating or painting, exhibiting only about 100 peaks of irregularity per inch. It will be readily apparent from these highly enlarged views that there is considerably more spacing between many of the successive recognizable peaks in FIG. 3 than in any of the other profiles.

In the above fashion, continuous production of steel strip which fully meets the standards of matte or blasted finish, is assured, i.e., so that the product is uniformly acceptable in surface roughness. In accordance with the invention, such roughness involves at least about 140 peaks per inch, such characteristic being therefore a basic definition of the term matte finish herein.

As explained above, a convenient mode of operation of the contour-sensing instrument, or of other means enabling a count of the peaks per unit length, is to drive the exploring stylus first in one direction and then another, along a given line. The arrangement shown in FIG. 7 represents a specific improvement in apparatus to be operated in this manner, such as the devices of FIG. 2. It will be understood that the mechanical and electrical parts of FIG. 7 are illustrated in a purely schematic manner, without regard to dimensioning or proportions, and with omission of various auxiliary parts (including relay control for the multi-contact switch), as will be appreciated by those familiar with instruments and equipment of types used in combination in this arrangement. Thus in FIG. 7 the transducer head 15, for moving the stylus 19 across the rough surface 13 of the sheet sample 10a, is displaced by the rod assembly 30, which is driven lengthwise by appropriate arrangement 31 of gearing and a lead screw, from a reversible motor 32. The motor 32 is shown as having a supply circuit 33 and three terminals 34, 35 and 36 for reverse of drive direction, as by shorting the terminal 35 to one or the other of the terminals 34, 36. Conveniently, the motor 32 is of a known, quick-reversing type, providing a highly constant speed of drive, say at one-eighth inch per second of the sensing head 15.

For simplicity, electrical signals from the head 15 are shown as carried through the amplifier 22a to the coil or other actuating element 38 of the pen arm 25 in the recorder 24. Thus the surface contour traced by the stylus 19 is drawn as a profile 40 on the paper chart 26, while the latter is continuously advanced and wound on a reel by appropriate drive means 41.

In order to have automatic reversal of the motor drive (for expediting readings in both directions), the traverse rod mechanism 30 may actuate appropriate limit switch mechanism; here such arrangement is simply illustrated as involving limit stops 42, 43, which are effective to throw the switch arm 44 one way or the other at respectively opposite ends of the desired path of travel, the switch (or equivalent control device) being designed to remain in either of the positions until displaced to the other.

For motor reversal, either automatically or manually, a single pole double throw switch is connected to the motor, as by connection from the movable arm 45 of such switch to the terminal 35 and the alternately engaged switch contacts 46, 47 to the terminals 34 and 36, respectively. In accordance with the present invention, a double pole double throw switch is employed, of which one arm and set of alternate contacts constitute the above-described motor-reversing switch, while the other arm 49 and its contacts 50, 51 are arranged to control a signal circuit for actuation of a supplemental pen arm 52 in the recorder. Thus the actuating element 54 of the switch, which moves the arms 45, 49 simultaneously between their associated pairs of contacts, is controlled by the limit-responsive means on the drive arm 30, for example as shown (for simplicity) by mechanical connection to the actuating arm 44. The supplemental pen arm 52 is arranged to trace an additional line near one side of the chart 26, the inking point being aligned, transversely of the chart, with that of the profile-tracing arm 25. Suitable means are provided for shifting the arm 52 a small distance crosswise of the chart, such means being diagrammatically indicated as a pair of coils 55, 56, alternately energizable to shift a core member 57 which moves the arm 52. One terminal each of the coils 55, 56 being respectively connected to the switch contacts 51, 50, the other coil terminals are connected together to one side of a source of current 58, from which the circuit is completed to the switch arm 49, it being understood that such current source may, if desired, be a suitable rectifying means, energized across the motor power terminals, i.e., in lieu of the simple battery shown in 58.

With this arrangement, the supplemental pen arm 52 draws a continuing line 60 on the chart simultaneously and in exact synchronism with the horizontal travel of the contour-tracing arm 25. When the stylus 19 is being moved in one direction, for example to the right as shown, one pair of contacts, viz., 49, 51 is closed, holding the pen arm in one position, so that the line 60 appears at the locality indicated by its position 61. When the stylus drive reverses, by displacement of the switch element 54 shifting the motor-reversing contacts, an alternate set of contacts 49, 50 is closed (and contacts 49, 51 opened) so that the pen arm 52 is shifted to its other position, as by energization of the coil 56 rather than the previously energized coil 55. In this alternate position the pen line 60 appears in a sidewardly displaced location, viz., as indicated at 62 for previous marking on the chart. The arm also makes a short angular or transverse mark, as at 63, during the reversing operation.

Referring to FIG. 8, showing a chart 26a produced by the apparatus of FIG. 7, it will be seen that successive portions of the contour line 40, representing successive forward and reverse traversals of the sensing device 15, are in effect clearly marked by the supplemental line 60. Alternate portions of the latter 61a, 62a register alternate directions of stylus travel, while the short transverse lines 63a mark the beginning and end of each traversal.

It will thus be seen that when the apparatus of FIG. 7 is employed, the procedure of measuring successive specimens of steel strip in the rolling operation is facilitated. On each specimen the motor is allowed to drive the device 15 forwards and backwards at the prescribed rate for one or more round trips, each of a specified length, say one inch or two inches. Each single-direction passage is clearly indicated on the chart, and counts of the number of peaks, as per inch, are very readily achieved, it being unnecessary, as without the device of FIG. 7, to have a separate operator call off the direction and reversal of the sensing device so that an attendant watching the chart can mark it accordingly. With the present device, the counts are reliably correlated to actual distances of travel, for accurate determination of the surface peak frequency.

After each test of the strip, with averaging of several traversals if desired, the condition of the work rolls 11, 12 is appraised, and replacement of the rolls with fresh-surfaced ones is made from time to time as necessary. The production of steel strip, uniformly meeting the requirements of roughened surface, as at 140 peaks per inch or at a selected higher value, is thus achieved and maintained over a continuing period of time, indeed indefinitely. It will be appreciated that although the apparatus of FIG. 7 can be modified or can include supplemental relays or other control devices, or the special pen 52 can be electrically actuated in one direction only (with spring or gravity return to the other position), the illustrated arrangement schematically represents the operative features of the device.

Whereas the invention in an important aspect is related to, and is particularly suitable for, the production of steel strip (the term steel being used, for brevity, to mean various steels, including stainless varieties, and indeed any of the materials commonly classed as ferrous metal), the improved procedures for maintaining the defined matte finish are also applicable to the production of similar rolled strip of other metals, especially those of some mechanical strength such as brass, other copper-containing alloys, titanium, and the like.

FIG. 9

This figure illustrates schematically apparatus for counting the number of roughness peaks per unit linear distance. This apparatus is shown in detail in FIGS. 10A and 10B and is described in detail below in connection with those figures. FIG. 9 is provided to give an overall picture of the apparatus.

As shown in FIG. 9, the apparatus includes a pick-up unit 101, which may consist of certain components of prior art mechanisms used for measuring the average height of the roughness peaks. Such a prior art apparatus is shown in somewhat more detail, but still diagrammatically, in FIG. 11. The output of the pick-up unit is an electrical wave illustrated graphically at 102, which represents a profile of the surface whose roughness is being measured. The output of the pick-up unit is fed to an automatic gain control circuit 103, whose function is to even out variations in amplitude in the wave 102, so that the subsequent circuit components receive waves of a standard amplitude. By virtue of this gain control circuit, it is not necessary for an operator of the apparatus to make individual adjustments of the gain between samples which are being tested.

The output of the automatic gain control circuit 103 is fed to a filter circuit 104, which attenuates the components whose frequencies are higher than the band of interest in the sample under investigation. For example, in apparatus for measuring the roughness of a matte finish on rolled steel, where the transducer in the pick-up unit moved at a speed of one eighth inch per second over the surface, the frequency range passed by the filter 4 was below 50 cycles per second. The curve 105 represents the output of the filter 104. It may be seen by comparing the curve 105 with the curve 102 that most of the high frequency components had been eliminated in curve 105.

The output of filter 104 is fed to a differentiator 106 whose output consists of a series of sharply peaked pulses which are coincident with the points of maximum rate of change of slope of the curve 105, i.e., the sharpest points in the profile. The curve of these pulses is shown at 107. It will be noted that the curve 107 includes pulses of both polarities with respect to a datum potential. Typically, but not necessarily, the pulses of curve 107 are coincident with the maxima and minima of curve 5. See the pulses 107c and 107d, which are a typical in this respect.

The output of differentiator 106 is fed to a clipper 108 which separates the positive pulses from the negative pulses, and inverts the latter. The clipper 108 has two output lines 109 and 110. The line 109 carries a series of pulses shown at 111, coincident with positive output pulses from the differentiator 106. The line 110 carries a series of positive pulses 112, coincident with negative output pulses from the differentiator 106.

The output lines 109 and 110 are connected to a bistable multivibrator 113, whose output shifts from a more negative stable value to a more positive stable value in response to one of the pulses in line 109, and shifts back from the more positive value to the more negative value in response to one of the pulses in line 110. The square wave output of the multivibrator 113 is shown by the line 114 in FIG. 11. This square wave output is fed to a limiter circuit 115, which also inverts the wave to give the output wave shown at 116. It may be seen that the square waves in the line 116 vary in duration. These are fed to a monostable multivibrator 117 which produces an output wave consisting of square waves of a standardized duration, as shown at 118. It may be seen that each of the square waves in the line 118 has its beginning coincident with the beginning of a square wave in the line 116, but that the durations of the waves in the line 118 are all equal. The output of the multivibrator 117 is fed through a line 119 to an amplifier 120 having output characteristics suitable for energizing the coil 121 of a mechanical counter 122.

FIGS. 10A AND 10B

The input signal from the pick-up unit 1 is supplied to the control grid 125g of a pentode 125, which may be a type 5879, and is also supplied to the control grid 126g of one triode 126 of a twin triode 126, 127 which may be a type 12AU7. The two triodes 126, 127 are connected as conventional cascaded amplifiers, except for a 30,000 ohm resistor 128 connected between the cathodes. The resistor 128 provides a small positive feedback which serves to increase the overall gain of the stage, and avoids the need for large cathode bypass capacitors which are sometimes used for a similar purpose. The output is taken from the anode of the triode 127 and is fed through a capacitor 129 to the common junction 130 of two type 1N645 silicon diodes 131 and 132. The cathode of diode 131 and the anode of diode 132 are connected to the junction 130. The diodes 131 and 132 are connected as a half wave voltage doubler and serve to rectify the signal voltage. The output of the voltage doubler is taken between ground and a junction 133 connected to the anode of diode 131. The potential at junction 133 is negative with respect to ground and is proportional to the input signal amplitude. A capacitor 134 and a resistor 135 are connected between junction 133 and ground and serve as a filter for the output of the voltage doubler. The potential at output terminal 133 is fed through a wire 136 to the suppressor grids of pentode 125 and another pentode 137, which may also be a type 5879. The amplification capabiilty of the tubes 125 and 137 is an inverse function of the negative suppressor grid potential, which, as supplied from terminal 133 is proportional to the output of the signal input. The gain of the tubes 125 and 137 is therefore inversely proportional to the signal input amplitude. The signal at the anode is inverted in relation to the input signal at the grid.

The tube 137 is not connected directly into the signal circuit, but is used as a "dummy" to balance the plate and screen grid currents of the tube 125, so that the sum of the currents passing through the load resistors 138 and 139 remains essentially constant under dynamic conditions. This arrangement provides smooth, transient-free operation without resorting to the complications of push-pull circuits.

The output of the automatic gain control circuit 103 is taken through a wire 140 connected to the anode of tube 125. The wire 140 leads through a coupling capacitor 141 and a resistor 142 to the control grid 143g of a triode 143 comprising one half of a twin triode 143, 144. Control grid 143g is also connected through a resistor 145 to ground and through a resistor 146 to a parallel-T filter network generally indicated at 147, and a capacitor 148 to the anode of triode 143. The common junction 149 between the filter network 147 and capacitor 148 is connected to ground through a resistor 150 provided with a variable slider 150a, which is in turn connected to the control grid 144g of triode 144. The anode of triode 144 is connected through a second parallel-T filter network 151 to an output terminal 152 of the filter circuit 104.

The resistor 142 isolates the filter network 147 from the load imposed by the previous stages. The filter network 147 is constructed to provide attenuation at frequencies above approximately 48 cycles. The filter 147 provides a negative feedback path from the output of triode 143 to its input. This negative feedback path is effective at higher frequencies remote from 48 cycles and thus reduces the gain at those frequencies.

The slider 150a cooperating with the resistor 150 provides the means of adjusting the gain of the filter 104. The filter 151 is designed to provide attenuation above 70 cycles. The cooperative action of the filter networks 147 and 151 is to provide a smooth and reasonably sharp frequency characteristic which is high below 50 cycles and starts to drop at that frequency, and is reduced approximately 35 decibels at 70 cycles.

The filter 104 has two general purposes. One purpose is to attenuate hum and noise frequencies which may be present in the signal. The other purpose is to compensate for the frequency characteristic of the following differentiator network 106. The latter network, in common with all differentiators, has an inherent characteristic which tends to accentuate high frequencies having high rates of change of signal potential, and to attenuate low frequencies, having relatively low rates of change of signal potential.

The output signal of the filter 104 is taken from the terminal 152 through a wire 153 to the control grid 154g of a triode 154, which may be one half of a type 12AU7 twin triode. The triode 154 is connected as a cathode follower and presents a high impedance to the output of the filter 104, as is necessary for proper operation. In addition, it provides a low impedance output to drive the differentiating network consisting of a capacitor 155 and a resistor 156. A resistor 157 is connected between grid 154g and ground, and provides proper voltage distribution so that the grid 154g may be coupled through filter netwrok 151 to the anode of triode 144 without the use of a coupling capacitor.

The time constant of the differentiating network including capacitor 155 and resistor 156 is short as compared to the period of input signals which are being counted. Consequently, the output of the differentiator network 106 is a series of positive and negative peaked pulses coincident with the reversals in the slope of the wave form of the incoming signal. This output is taken from the common terminal 158 of capacitor 155 and resistor 156.

The output of differentiator 106 is connected through a wire 159 and (see FIG. 10B) resistors 160 and 161, respectively, to the control grids 162g and 163g of twin triodes 162, 163 of the clipper 108. The triode 162 is operated without grid bias and hence will clip off positive signals while passing negative signals. The triode 163, on the other hand, is biased to cut off. It therefore clips off negative signals while passing positive signals. Bias potential is supplied to the triode 163 by means of a voltage divider including resistors 164 and 165. Resistor 165 has a slider contact 165a which permits bias voltage adjustment. A capacitor 166 bypasses the resistor 165 and serves as a filter for the bias potential. The resistors 160 and 161 isolate the clipper stages (triodes 162 and 163) from each other so as to prevent interaction between them. Outputs are taken from the anode of triode 162 through a wire 167 and from the cathode of triode 163 through a wire 168, and thence through coupling capacitors 169 and 170, respectively, to the two input terminals 171 and 172 of the bistable multivibrator 113.

The multivibrator 113 includes two triodes 173 and 174 which may be the two halves of a twin triode, for example a type 12AT7.

Each of the peaks to be counted is characterized by a maximum followed by a minimum in the input wave form (see curve 102, FIG. 9). Typically and desirably, each maximum produces a positive peak 107a in the wave form 107 at the output of the differentiator, and each minimum produces a negative peak 107b in that wave form.

The sharpest peaks in the output of a differentiating circuit are coincident with the greatest rates of change in its input potential. In the present situation, if the peaks and valleys of the profile are relatively sharp and the shoulders, if any, on the intervening slopes are relatively rounded, then the output pulses from the differentiator 106 coincide with the peaks and valleys of the profile. There may occur sharp shoulders on the slopes between the peaks and valleys, as at 105c in FIG. 19 which shoulder produces a sharp output pulse from the differentiator 106. This phenomenon constitutes a possible source of error in a count of the peaks. This source of error is substantially overcome in the present apparatus by the use of the bistable multivibrator 113. The bistable multivibrator 113 is provided so as to supply a single square wave output pulse only in response to a negative pulse 107b followed by a positive pulse 107a, thereby eliminating most false counts due to the source of possible error just described.

The grids 173g and 174g of the triodes 173 and 174 are cross coupled to the anodes of the opposite triodes through resistors 175 and 176. As is well known in multivibrator circuits, when either of the two triodes 173, 174 is conducting, the other triode is cut off. At the beginning of a count with the apparatus disclosed, the triode 174 is rendered conductive by the momentary closing of a reset switch 177 having a contact 177a which connects a wire 178 to the positive terminal of the B supply. Wire 178 is connected through a resistor 179 to grid 174g. The switch 177 is spring biased to open position and is momentarily closed at the start of each new count.

The output of multivibrator 113 is taken from the anode of triode 173 through a wire 180. After operation of the reset switch 177, triode 174 is conducting and triode 173 is cut off. The first switching of the multivibrator therefore is accomplished by one of the negative pulses 107b in line 107 of FIG. 9 which has been inverted to a positive pulse by the clipper 108 and appears at the grid 173g as one of the positive pulses in line 112 of FIG 9. This pulse switches the multivibrator, turning the triode 173 ON and the triode 174 OFF. The output potential at the anode of triode 173 drops to a more negative value due to the potential drop in the load resistor, as illustrated in line 114 of FIG. 9. When the next positive pulse 107a appears at grid 174g, the multivibrator 113 is switched back again to its initial condition, completing a square wave output at the anode of triode 173.

Wire 180 is connected to the input of the limiter circuit 115 through a coupling capacitor 181.

The limiter 115 comprises a triode 182 which may be one half of a type 12AU7 twin triode. The cathode of triode 182 is connected through a wire 183 to the common junction of the resistors 164 and 165, so that triode 182 is biased below cut off. A series grid resistor 184 limits the grid current to a safe value. The load connected to the anode of triode 182 consists of two series connected resistors 185 and 186. The output from the limiter 115 is taken from the common junction of the resistors 185 and 186. The limiter stage inverts the signal supplied to it, as is common with triode stages, the output signal appearing at 116 in FIG. 9.

The output signal from limiter 115 is supplied to the monostable multivibrator 117, which includes two sections of a twin triode 187, 188. Output pulses from the limiter 115 are fed to the anode of tube 187 through a silicon diode 189. The anode of triode 187 is connected to the positive B supply through a load resistor 190 and to the grid 188g of triode 188 through a capacitor 191. The cathodes of triodes 187 and 188 are connected together and are grounded through a bias resistor 192. The grid of triode 187 is connected to ground. The grid of the triode 188 is connected to the positive B supply through a resistor 193.

The monostable multivibrator provides one output pulse of a predetermined fixed duration for each input triggering pulse. The input pulses may vary in amplitude, wave shape and duration, but the output pulses are constant in all these respects. The triode 188 is normally conducting heavily due to the bias provided by a voltage divider including resistor 193, two further resistors 194 and 195, and a diode 196. The triode 187 is held cut off by the potential across resistor 192. With triode 187 cut off, the potential at its anode is substantially that of the positive B terminal and the potentials at both terminals of diode 189 are approximately the same. Under these conditions, the diode 189 can pass applied negative trigger pulses to the control electrode 188g of triode 188. When such a pulse is received at grid 188g, diode 196 is reversely biased and becomes nonconductive, and triode 188 is cut off. At the same time, triode 187 becomes conductive by virtue of the coupling through the common cathode resistor 192. When triode 187 becomes conducting, the potential at its anode, and hence at the anode of diode 189, is greatly reduced. This reversely biases the diode 189 and makes it nonconductive, thereby isolating the multivibrator from the previous stages. The conditions of triodes 187 and 188 just described continue until the negative charge on capacitor 191 is dissipated through resistors 193 and 190. This charge was introduced by the negative input pulse and maintains the triode 188 cut off until it is substantially dissipated. As soon as the charge of capacitor 191 falls to a value such that the triode 188 is no longer cut off, triode 188 again starts to conduct and produces a potential drop across resistor 192 which cuts off the triode 187, restoring the multivibrator to its normal or stable state.

When the multivibrator 117 is in its stable state, the silicon diode 196 holds the grid 188g at a fixed reference potential, as determined by the divider action of the resistors 193, 194 and 195. By virtue of this fixed potential, the initial charge of capacitor 191 is always uniform. This assures operational stability, so that the output pulses are positive square waves of fixed duration taken from the anode of triode 188 through a wire 197 and a coupling capacitor 198.

Signals are transmitted through the coupling capacitor 198 to the input of the amplifier 120 including a tetrode 199, which may be a type 6AQ5. The coupling capacitor 198 is connected through a resistor 198a to the control grid 199g of tetrode 199. The output of tetrode 199 is connected through the operating coil 121 of the mechanical counter 122 and a switch 121a to the positive terminal of a power supply indicated at B+. The cathode of tetrode 199 is connected through a wire 200 to the common junction of the voltage divider resistors 164 and 165.

The counter 122 is provided with a reset coil 201, and is so constructed that the dial or cyclometer of the counter is restored to zero by energization of the reset coil. Mechanical counters operated by coils such as that diagrammatically indicated at 121 and provided with reset coils, such as that shown at 201, are common in the art. The details of their construction form no part of the present invention. The energization circuit for the reset coil 201 is controlled by the contact 177b of the reset switch 177 and may be traced from the B+ terminal through the coil 201, contact 177b, and a wire 202 to the common junction of the voltage divider resistors 164 and 165.

The circuit shown distinguishes between a flat ledge on the side of a peak, as shown at 105c and 107c in FIG. 9, and a true peak, as shown at 105a and 107a. The circuit counts the true peaks and ignores the ledges such as 105c.

FIG. 11

This figure illustrates a mechanism which is used in the prior art to measure the average roughness height, and which may be utilized in cooperation with the counter of the present invention to determine completely the roughness characteristics of the samples being measured.

There is shown in FIG. 11 a sample 284 whose roughness is being measured. The measuring apparatus includes a pick-up unit 101, which includes a stylus 285 forming part of a transducer 286, which is driven over the surface of the sample 284 by a motor drive mechanism schematically indicated at 187. The transducer 286 sends an electrical signal through a wire 288 to an average height meter 289, through a wire 290 to an amplifier 291, and through a wire 290a to the input of the circuit of FIG. 10A. The amplifier 291 is shown as having an output wire 292 connected to a recorded 293 which draws an amplified profile of the surface being measured on a conventional recording chart.

Typical average height measuring mechanisms of the type described in this figure are shown in detail and described in the patent to Abbott, No. 2,240,278 and in the patent to Arndt, No. 2,460,726. Such mechanism measure the average deviation of the surface profile from a median line.

In order to specify completely the roughness of a surface so that its practical qualities (e.g., drawing qualities and paint-receiving qualities) may be definitely predicted the specifications should include a limitation of the average roughness height, which is the quality measured by the Abbott and Arndt apparatuses, and should also include a specification of the total number of peaks over a specified distance (e.g., one inch). The total peaks may be measured by the counter mechanisms of FIGS. 10 and 10B.

The presently preferred method of measuring the roughness characteristics of a surface in accordance with the present invention, so as to provide a complete and meaningful classification of the surface finish, include the steps of measuring the average roughness height and simultaneously counting the roughness peaks per unit distance. The count of the roughness peaks may be accomplished preferably by using the peak counting circuit of FIGS. 10A and 10B.

While specific forms of the invention have been described for purposes of illustration, it is contemplated that numerous changes may be made without departing from the spirit of the invention.

What is claimed is:

1. In apparatus for examining and indicating surface roughness characteristics of steel strip or the like, in combination, a sensing device movable along the surface be examined, for producing electrical signals represent the contour of said surface, means controlled by s sensing device and having an indicating area, for prod ing in said area a visible response to said signals for determination of a contour property of said surface, reversible driving means including control means for effecting reversal thereof, for displacing the sensing device selectively in opposite directions along the said surface, and means controlled by said control means and including supplemental visible signal means adjacent said area for producing a visible indication of the direction in which the sensing device is moving.

2. In apparatus for examining and indicating surface roughness characteristics of steel strip or the like, in combination, a sensing device movable along the surface to be examined, for producing electrical signals representing the contour of said surface, means controlled by said sensing device and including a recording device having chart-handling means for marking on such chart a representation of the surface contour traversed by the the sensing device, reversible driving means including control means for effecting reversal thereof, for displacing the sensing device selectively in opposite directions along the said surface, and means controlled by said control means and including supplemental marking means connected to said recording device, for marking said chart distinctively to indicate reversals of travel direction of the sensing device, relative to the representation of surface contour on said chart.

3. In apparatus for examining and indicating surface roughness characteristics of steel strip or the like, in combination, a sensing device movable along the surface to be examined, for producing electrical signals representing the contour of said surface, recording means controlled by said sensing device and including a marking element, a chart therefor, and drive means moving one of said element and chart continuously relative to the other, for marking on said chart a representation of the surface contour traversed by the sensing device, reversible driving means including control means for effecting reversal thereof, for displacing the sensing device selectively in opposite directions along the said surface, and supplemental recording means including a supplemental marking element operating on the chart, the aforesaid first-mentioned drive means effecting relative movement of said chart and supplemental element in synchronism with the relative movement of the first element and chart, said supplemental recording means being controlled by said control means, for producing a line on said chart which is shifted selectively into alternate positions corresponding to the direction of sensing device travel, for indicating, relative to the contour representation, successive reversals and travel directions of said sensing device.

References Cited
UNITED STATES PATENTS

| | | | |
|---|---|---|---|
| 409,049 | 8/1889 | Lewis | 80—60.1 |
| 1,856,898 | 5/1932 | Wood | 80—60.1 |
| 2,397,923 | 4/1946 | Cross | 73—105 |
| 2,405,133 | 8/1946 | Brown | 73—105 |
| 2,728,222 | 12/1955 | Becker et al. | 73—105 |
| 3,010,777 | 11/1961 | Melton et al. | 346—33 |
| 3,112,642 | 12/1963 | Harmon et al. | 73—105 |

OTHER REFERENCES

Shaper, H. B.: Measuring Roughness, In Scientific American, p. 118, March 1944, T 1.S5 (copy in 73–105).

Surface Roughness, Waviness and Hay. ASME 1955, p. 8 (copy in 73–105).

RICHARD C. QUEISSER, *Primary Examiner.*

DAVID SCHONBERG, WILLIAM J. STEPHENSON, *Examiners.*

J. W. MYRACLE, C. H. HITTSON,
*Assistant Examiners.*